United States Patent
Hovis et al.

(10) Patent No.: US 11,093,019 B2
(45) Date of Patent: Aug. 17, 2021

(54) INTEGRATED CIRCUIT POWER DOMAINS SEGREGATED AMONG POWER SUPPLY PHASES

(71) Applicant: Microsoft Technology Licensing, LLC, Redmond, WA (US)

(72) Inventors: William Paul Hovis, Sammamish, WA (US); Steven William Ranta, Cle Elum, WA (US); Andres Felipe Hernandez Mojica, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 83 days.

(21) Appl. No.: 16/524,687

(22) Filed: Jul. 29, 2019

(65) Prior Publication Data
US 2021/0034136 A1    Feb. 4, 2021

(51) Int. Cl.
G06F 1/32      (2019.01)
G06F 1/3234    (2019.01)
G06F 1/3225    (2019.01)
G06F 1/3203    (2019.01)

(52) U.S. Cl.
CPC .......... G06F 1/3275 (2013.01); G06F 1/3225 (2013.01); *G06F 1/3203* (2013.01)

(58) Field of Classification Search
CPC ...... G06F 1/3215; G06F 1/325; G06F 1/3296; G06F 1/3275; G06F 1/3225
USPC ........................................................ 713/320
See application file for complete search history.

(56) References Cited

U.S. PATENT DOCUMENTS

| | | | |
|---|---|---|---|
| 8,072,719 B2 | 12/2011 | Jin et al. | |
| 8,245,061 B2 | 8/2012 | Rauschmayer et al. | |
| 8,347,130 B2 | 1/2013 | Park | |
| 8,924,758 B2 | 12/2014 | Steinman et al. | |
| 9,166,412 B2 | 10/2015 | Hoberman et al. | |
| 9,378,536 B2 | 6/2016 | Park et al. | |
| 9,899,838 B2 * | 2/2018 | Elasser | H02M 5/2573 |
| 9,910,481 B2 | 3/2018 | Lee et al. | |
| 9,921,624 B1 * | 3/2018 | Okamura | G06F 1/206 |
| 10,608,539 B1 * | 3/2020 | Huang | H02M 3/073 |
| 10,666,279 B1 * | 5/2020 | Schurmann | H03M 1/162 |
| 2008/0231352 A1 * | 9/2008 | Kurd | H03L 7/08 |
| | | | 327/544 |
| 2009/0204835 A1 | 8/2009 | Smith et al. | |
| 2009/0249092 A1 | 10/2009 | Lam et al. | |
| 2010/0262879 A1 | 10/2010 | Floyd et al. | |

(Continued)

FOREIGN PATENT DOCUMENTS

CN    101449225 A    6/2009
WO    2017213973 A1  12/2017

OTHER PUBLICATIONS

"International Search Report and Written Opinion Issued in PCT Application No. PCT/US20/036730", dated Sep. 25, 2020, 13 Pages.

*Primary Examiner* — Volvick Derose

(57) ABSTRACT

Power supply architectures and enhanced power control techniques are presented herein. In one example, a system includes a plurality of power supply phases and a system processor. The system processor comprises a processing unit comprising a plurality of processing cores, a plurality of power domains configured to segregate power distribution for the processing unit into sets of the plurality of processing cores, and external connections configured to couple individual ones the plurality of power domains to individual ones of the plurality of power supply phases.

18 Claims, 5 Drawing Sheets

(56) References Cited

U.S. PATENT DOCUMENTS

| | | | |
|---|---|---|---|
| 2011/0115447 A1* | 5/2011 | Lin | H02M 3/1584 |
| | | | 323/234 |
| 2012/0091815 A1* | 4/2012 | Richards, III | H02M 1/32 |
| | | | 307/80 |
| 2014/0117518 A1* | 5/2014 | Fernando | H01L 23/49541 |
| | | | 257/666 |
| 2015/0207400 A1* | 7/2015 | Shenoy | H02M 3/1584 |
| | | | 323/213 |
| 2016/0141950 A1* | 5/2016 | Goth | H02M 3/285 |
| | | | 363/65 |
| 2017/0163028 A1* | 6/2017 | Kilroy | H02H 1/0023 |
| 2018/0316255 A1* | 11/2018 | Tang | H02M 3/158 |
| 2018/0364784 A1* | 12/2018 | Luo | G06F 13/4072 |

* cited by examiner

INTEGRATED CIRCUIT POWER DOMAINS SEGREGATED AMONG POWER SUPPLY PHASES

BACKGROUND

Integrated circuit devices, such as central processor devices, graphics processors, or system-on-a-chip (SoC) devices can be employed in computing systems. These integrated circuit devices can have one or more voltage domains which correspond to particular power distribution subdivisions within the integrated circuit device. Power consumption in integrated circuit devices can have a substantial power budget allocated to processing cores, graphics cores, interfacing elements, or various system-on-a-chip (SoC) elements. This power consumption can lead to heat dissipation concerns, especially as operating frequency is increased.

Manufacturers of integrated circuit devices typically specify various minimum operating voltages for the various voltage domains of the integrated circuit devices. However, integrated circuit devices have variability in power consumption due to manufacturing variability, variation in minimum feature sizes, and other factors. This can lead to system integrators to power integrated circuit devices at unnecessarily high operating voltages, which can increase thermal dissipation and provide artificial limits on operating frequency, and thus limit performance of systems that incorporate such integrated circuit devices.

OVERVIEW

Power supply architectures and enhanced power control techniques are presented herein. In one example, a system includes a plurality of power supply phases and a system processor. The system processor comprises a processing unit comprising a plurality of processing cores, a plurality of power domains configured to segregate power distribution for the processing unit into sets of the plurality of processing cores, and external connections configured to couple individual ones the plurality of power domains to individual ones of the plurality of power supply phases.

In another example, an integrated circuit device includes a plurality of processing cores within a processing unit, and a plurality of voltage domains. The plurality of voltage domains are configured to form electrically isolated subsets among the processing cores within the processing unit and distribute input voltages within the subsets to associated ones of the plurality of processing cores. The integrated circuit device also includes interconnect elements segregated among the subsets and configured to individually couple the plurality of voltage domains to corresponding external power supply phases.

In another example, a computing system includes a plurality of power supply phases configured to produce voltages, a power controller configured to instruct the plurality of power phases to adjust levels of the voltages, and a system processor. The system processor includes at least one processing unit having a plurality of cores, a plurality of voltage domains each configured to provide voltage isolation among sets of the plurality of cores, and voltage input elements configured to receive the voltages from the power supply phases and conductively couple ones of the voltages to corresponding voltage domains.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
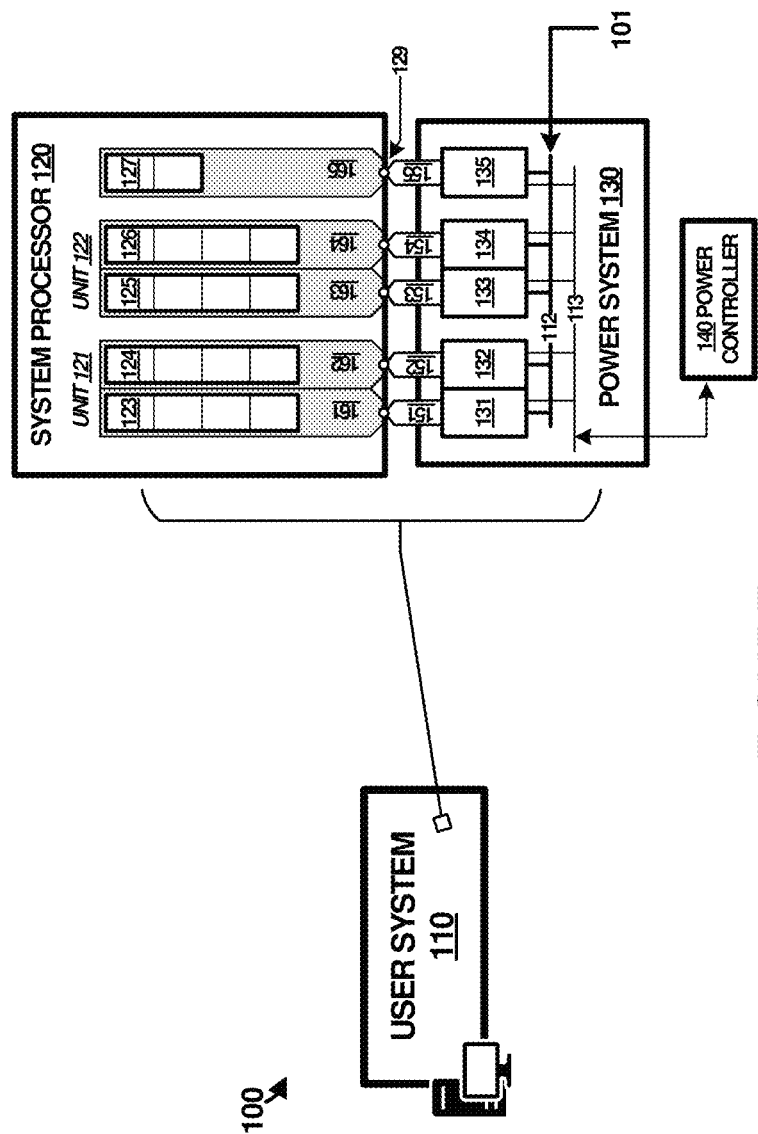
FIG. 1 illustrates a computing system in an implementation.

Integrated circuit devices can comprise various system processors, such as system-on-a-chip (SoC) devices, central processing units (CPUs), and graphics processing units (GPUs), among other devices. These system processors can include multiple "cores" which are individual instances of processors within the same die or chip-scale package, and each core comprises dedicated execution units and control structures. Cores can comprise data processing cores, graphics processing cores, input/output (I/O) cores, power control cores, or security cores, among other core types. Power consumption levels on such multi-core integrated circuit devices are significant and often dominate the power consumption budget for associated computing systems or computing devices.

In order to improve the power performance and characteristics of multi-core integrated circuit devices, the examples herein discuss enhanced architectures and techniques. In some examples, individual power supply phases are configured to power only a subset of the total cores of a processing unit within a multi-core integrated circuit device. These power supply phases comprise separate instances of power conversion circuitry or power regulator circuity that convert a source voltage into a resultant voltage provided to the corresponding set of cores. For example, a four phase power supply might power ¼ of the total cores of a CPU. In another example, such as a 40-core GPU, four power phases might provide power to 10 cores per-phase. To implement such configurations, each set of cores is segregated into a separate power domain from the other cores.

Power domains in a multi-core integrated circuit device each form separate power/voltage islands or regions in a semiconductor die of the integrated circuit device. These power domains comprise isolated voltage regions which are electrically segregated on-die and through an associated module package and external connections to the system board. At a system level, each power domain is individually powered by a single corresponding power phase. However, since the power phases are electrically isolated or segregated, voltage levels provided by each power phase can differ and be independently adjusted as desired to support the particular set of cores. For example, manufacturing, fabrication, and assembly variations within a multi-core integrated circuit device can be optimized using individual voltage levels for each power domain. Furthermore, low performance states where only a subset of the cores are required for a processing unit can have one or more power phases powered down. Other conventional designs might still keep all power phases active even if clock gating or other internal power switching is included to power down portions of an integrated circuit device. Thus, unwanted power dissipation still exists in the power phases for these other designs. The aforementioned per-domain powered-down states as well as domain-customized voltage minimization techniques can result in significant power savings for multi-core integrated circuit devices and associated computing systems.

Turning now to the various examples shown in the included drawings, FIG. 1 is presented which illustrates a computing environment in an implementation. Specifically, FIG. 1 includes computing environment 100. Environment 100 includes user system 110, which further includes system processor 120 and power system 130. Further example systems and elements which can implement the features discussed for user system 110 are included in at least FIG. 3 and FIG. 5 below.

User system 110 comprises a computing system or computing assembly, such as a computer, server, tablet device, laptop computer, smartphone, gaming system, entertainment system, storage system, or other computing system, including combinations thereof. User system 110 includes several components detailed in FIG. 1. These components include system processor 120, power system 130, and power controller 140. Furthermore, user system 110 can include assembly elements, namely enclosure elements, thermal management elements, memory elements, storage elements, communication interfaces, and graphics elements, among other elements. When system processor 120 is installed in user system 110, these assembly elements provide system resources and context for the operation of system processor 120. System processor 120 can comprise one or more integrated circuit elements, such as processor cores, cache memory, communication interfaces, graphics cores, and north bridge elements, among other integrated elements not shown for clarity.

Units 121-122 each comprise processing units of system processor 120. In some examples, a first among units 121-122 comprises a central processing unit (CPU) and a second among units 121-122 comprises a graphics processing unit (GPU). Such examples might include where system processor 120 comprises an integrated circuit device having multiple processing units on a single fabricated semiconductor die or on separate semiconductor dies but within a shared chip-scale package. System-on-a-chip (SoC) devices can include more than one CPU and GPU element, among other interfacing, control, and input/output cores or units. In a specific example, unit 121 comprises a GPU having eight cores separated into two groups or sets 123-124, while unit 122 comprises a CPU having eight cores separated into two groups or sets 125-126. Furthermore, one or more miscellaneous cores might be included for control, security, power control, interfacing, or other functions, and these miscellaneous cores are included in a set 127.

Each set 123-127 in FIG. 1 corresponds to a different voltage domain. The voltage domains, also referred to herein as power domains, provide electrical isolation among each other for input voltages. Thus, sets 123-127 each correspond to a different voltage region of system processor 120. These voltage regions might be formed by isolating voltage distribution elements of system processor 120, by physical segregation within a semiconductor die that forms system processor 120, or other elements. Although voltages among each set 123-127 are isolated or segregated, the sets might share a common reference voltage or ground. Isolated grounds can also be provided in a similar fashion to the aforementioned voltage isolation features.

Each set 123-127 couples to a dedicated external connection or dedicated group of external connections. These are shown in FIG. 1 by interconnect elements 129 indicating one or more pins, balls, pads, or other external interconnect for system processor 120. Electrical or voltage isolation among each voltage domain is provided from interconnect elements 129 and power/voltage distribution elements of each voltage domain within system processor 120. Advantageously, input voltages applied to interconnect elements 129 can differ among each voltage domain. Moreover, since cores within a processing unit can belong to different voltage domains, then voltages supplied to cores of a first voltage domain of the processing unit can vary/differ from other cores of a second voltage domain of the same processing unit. This configuration has several advantages over a processing unit that might receive a single or shared input voltage which is distributed to all cores of the processing unit, or a processing unit that provides separate internal voltage distributions still based on a common/shared input voltage to the processing unit.

As mentioned above, each of units 121-122 can include a plurality of cores. These cores can include separate and complete instances of execution cores. Cores can comprise data processing cores, graphics processing cores, input/output (I/O) cores, power control cores, or security cores, among other core types. Instructions and data can be provided to each core for processing/execution by the associated core. Various control elements, communication crossbar switching elements, internal communication fabrics, or other interconnect can be included which couple to each core and allow for distribution of instructions and data among the cores or other external elements.

As seen in FIG. 1, cores within a single processing unit are segregated into sets formed by domains 161-165, each of which receive separate power/voltage instances from external sources. In this manner, sets of cores within the same processing unit can concurrently operate using different input voltages, which might correspond to each set having a different voltage level for $V_{DD}$, $V_{CC}$, or $V_{SS}$, among other voltage designators. The designator $V_{DD}$ is employed herein to refer to the voltage level for convenience. Thus, several variable instances of $V_{DD}$ can be received by sets of electrically isolated external inputs (e.g. pins, balls, or pads) of interconnect elements 129. Advantageously, each instance of $V_{DD}$ can have a voltage level which differs from the other instances.

Power system 130 comprises a multiphase power supply and includes power phases 131-135 and power links 151-155. The total quantity of power phases can vary by implementation. Elements of power system 130 might be replicated a number of times to provide several voltages for system processor 120 or multiple system processors, such as when system processor 120 specifies different voltage levels for different functional portions. Power system 130 receives power from an external source over link 101, such as from batteries or an external power source, and converts/regulates the power to produce voltages and currents to operate the elements of user system 110. In operation, power system 130 receives an input voltage over external link 101, distributes the input voltage over input power bus 112, and converts the input voltage into one or more supply voltages. Power system 130 provides a plurality of supply voltages to system processor 120 over power links 151-155.

Power phases 131-135 can comprise voltage conversion circuitry, such as voltage regulators, AC-DC converters, DC-DC converters, power electronics elements, power filtering elements, power conditioning elements, and other similar circuitry. Power system 130 uses individual power phases to effectively split an associated output current among the power phases. Referred to as multiphase power supplies, power system 130 uses a plurality of power supply phases, namely power phases 131-135, to share the burden of a common large electrical load and maintain higher efficiency in each power supply phase. A higher quantity of phases corresponds to less electrical current handled by each individual phase, while a smaller quantity of phases corresponds to a higher current handled by each individual phase. Typically, a common electrical load is dynamic in operation (e.g. a processor or set of cores), and if the common electrical load decreases a demand for current, then operating a current quantity of power supply phases may be inefficient. Therefore, some power supply phases may be turned off and made dormant to reduce associated power consumption. Also, multiphase power supplies, such as power system 130, can have a master-slave relationship among the phases. In FIG. 1, such an arrangement might employ one of the power phases as a master, such as power phase 131, with the remainder of the power phases using an output of power phase 131 as a reference/feedback voltage for adjustments to corresponding output voltages for each power phase.

Power controller 140 is also shown in FIG. 1. Elements of power controller 140 can be included in system processor 120 or power system 130, including combinations thereof. Power controller 140 might instead comprise a discrete entity separate from system processor 120 or power system 130. Power controller 140 can comprise one or more microprocessors and other processing circuitry that retrieves and executes software or firmware, such as power phase control firmware, from an associated storage system. Power controller 140 can be implemented within a single processing device but can also be distributed across multiple processing devices or sub-systems that cooperate in executing program instructions. Examples of power controller 140 include a processing core of system processor 120 separate from other processing cores that execute user software for system processor 120, such as a hardware security module (HSM), hardware security processor (HSP), security processor (SP), trusted zone processor, trusted platform module processor, or management engine processor. Other examples of power controller 140 include one or more microcontrollers, microprocessors, field programmable gate array (FPGA) devices, application specific integrated circuit (ASIC) devices, application specific processors, or other processing elements.

In operation, power controller 140 can control voltage levels provided by power phases 131-135 to one or more voltage domains of system processor 120. System processor 120 can then boot into an operating system (OS) once provided with one or more supply voltages to execute various operations of user system 110 including user applications, communication services, storage services, gaming services, or other features of a computing system. Power controller 140 can monitor temperatures or other thermal properties of power phases 131-135. Power controller 140 can enable/disable individual ones of power phases 131-135.

Figure 2:
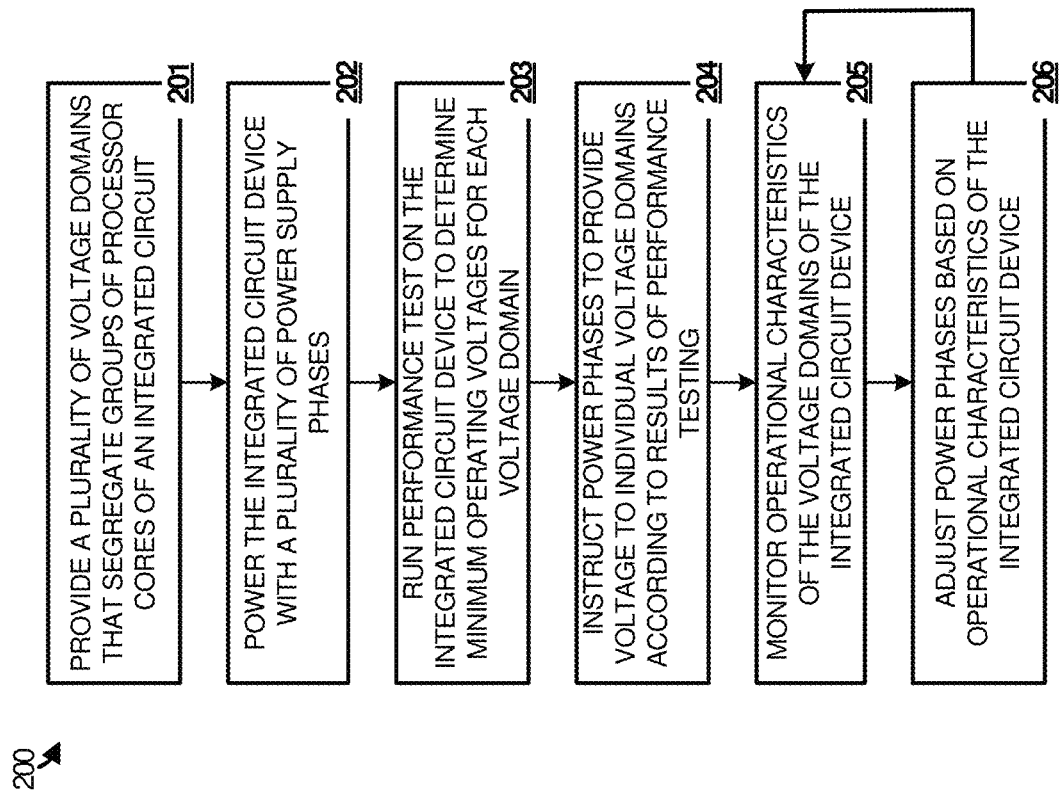
FIG. 2 illustrates a method of operating a computing system in an implementation.

FIG. 2 is included to illustrate operation of an enhanced computing system. Specifically, FIG. 2 is a flow diagram illustrating a method of operating elements of computing environment 100 in an implementation. In FIG. 2, system processor 120 provides (201) a plurality of voltage or power domains 161-165 that segregate groups of processor cores of an integrated circuit. In FIG. 1, these groups comprise sets 123-127 of processor cores. Set 123 is included in voltage domain 161, set 124 is included in voltage domain 162, set 125 is included in voltage domain 163, set 126 is included in voltage domain 164, and set 127 is included in voltage domain 165. Although two or four cores is shown per set in FIG. 1, it should be understood that a different quantity of cores might instead be included. However, the configuration shown in FIG. 1 illustrates at least two sets of cores per "unit" which comprises a processing unit. A processing unit can comprise a GPU or CPU, among other unit types. Thus, a first subset of cores within a processing unit can be included in a first voltage domain, while a second subset of cores within a processing unit can be included in a second voltage domain.

Power system 130 powers (202) the integrated circuit device comprising system processor 120 with a plurality of power supply phases 131-135. Each of power supply phases 131-135 can convert an input voltage provided over input link 101 and power bus 112 into individualized output voltages which supply system processor 120. The voltage levels of the output voltages of power supply phases 131-135 are adjusted according to control instructions provided over control link 113 by power controller 140. Power controller 140 can deliver indications of desired voltage levels over link 113 to power supply phases 131-135, and power supply phases 131-135 responsively produce voltages having the desired voltage levels. Link 113 can include one or more separate links, or can be shared by power supply phases 131-135. Link 113 can comprise system management bus (SMBUS) or inter-integrated circuit (I2C), or other link types.

However, to determine the desired voltage levels to be provided by power supply phases 131-135, a performance test can be performed which establishes one or more voltage levels optimized for the particular fabrication, manufacturing, or assembly variability of processor cores within each voltage domain. Thus, power controller 140, in conjunction with one or more external systems (not shown in FIG. 1 for clarity) runs (203) performance tests on system processor 120 to determine minimum operating voltages for each voltage domain. Although a further discussion of these performance tests is included in FIG. 4, these performance tests execute one or more test applications within an operating system booted by system processor 120. The performance tests can exercise various ones of the processor cores within each voltage domain while voltages applied to each voltage domain are gradually reduced. Once failures or anomalies are discovered during the performance testing for the processor cores within a particular voltage domain, then a presently applied voltage to that voltage domain during the failures can be determined to be below a minimum operating voltage for that voltage domain. A lowest successfully tested operating voltage can be established as a new minimum operating voltage for the voltage domain, which is typically significantly lower than a manufacturer-specified operating voltage for the system processor.

The performance testing can be repeated while individually varying voltages applied to each voltage domain to determine minimum operating voltage for each voltage domain. Indications of these minimum operating voltages, along with any desired margin for end-of-life or safety, can be stored for later use in a storage device. Then, power controller 140 can access these stored minimum operating voltages and instruct (204) power phases 131-135 to provide voltages to individual voltage domains according to the results of the performance testing. Since each voltage domain of system processor 120 is individually tested, then individually-customized voltages can be applied by each power phase to corresponding voltage domains according to results of the performance testing.

During operation of system processor 120, such as after boot into an operating system and during execution of one or more user applications, power controller 140 monitors (205) operational characteristics system processor 120 associated with the voltage domains. These operational characteristics can include a quantity of cores presently employed for execution of software by system processor 120, a workload of system processor 120, a present electrical current draw or power consumption within each voltage domain, or other characteristics. Power controller 140 then adjusts (206) power phases 131-135 based on operational characteristics of system processor 120. This adjustment can include increasing or decreasing a voltage level provided to individual ones of the voltage domains. This adjustment can also include enabling or disabling a power phase for one or more voltage domain responsive to activity or cessation of activity for processing cores comprising the voltage domain. Advantageously, voltage levels provided to sets of processing cores of system processor 120 can be individually adjusted to reduce power consumption for the sets of the processing cores or eliminate power consumption entirely when a particular set of processor cores is idle or dormant. Since each set of processing cores is included in a separate power domain, then voltage levels can differ among the sets. Moreover, since the sets each comprise subsets of the total quantity of processing cores for a processing unit, then a processing unit might have some cores operating at different voltages than other cores. These voltages are provided though dedicated external connections of system processor 120 from external power phases.

Figure 3:
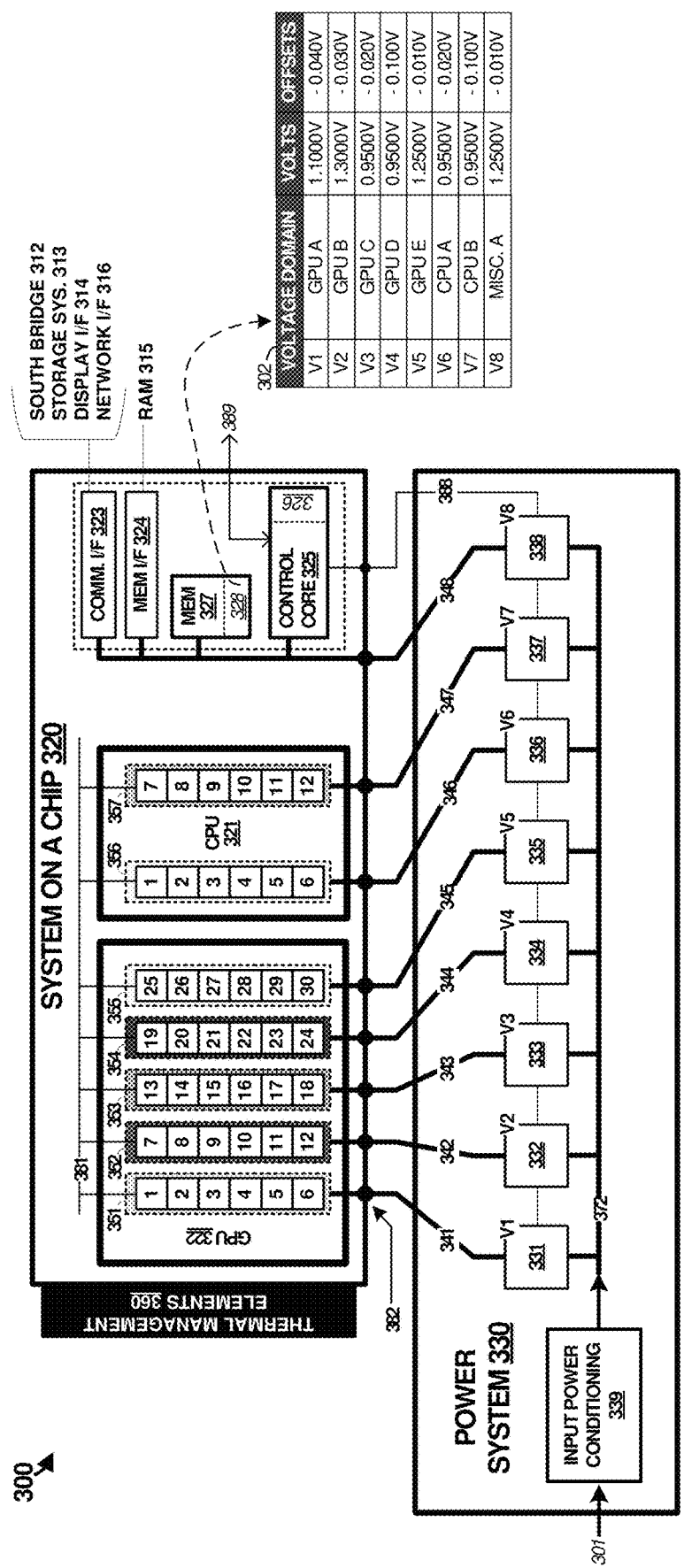
FIG. 3 includes a computing system in an implementation.

As a further example of power control within example computing environments and systems, FIG. 3 is presented. FIG. 3 illustrates computing system 300 that is representative of any system or collection of systems in which the various operational architectures, platforms, scenarios, and processes disclosed herein may be implemented. For example, computing system 300 can be used to implement any of the integrated circuit arrangements discussed herein, such as elements of FIG. 1, among others.

Examples of computing system 300 include, but are not limited to, a gaming console, smartphone, tablet computer, laptop, server, personal communication device, personal assistance device, wireless communication device, subscriber equipment, customer equipment, access terminal, telephone, mobile wireless telephone, personal digital assistant, personal computer, e-book, Internet appliance, media player, or some other computing apparatus, including combinations thereof.

Computing system 300 may be implemented as a single apparatus, system, or device or may be implemented in a distributed manner as multiple apparatuses, systems, or devices. Computing system 300 includes, but is not limited to, system on a chip (SoC) device 320 and power system 330. Various contextual or peripheral elements can be included in computing system 300, such as mounted to a corresponding motherboard or included on separate circuit boards. These elements include south bridge 312, storage system 313, display interfaces 314, random-access memory (RAM) 315, and network interfaces 316. Other elements can be included, such as north bridges, peripheral hubs, audio circuitry, graphics cards, storage devices, and various communication interface circuitry. Furthermore, input power conditioning circuitry 339 and optional thermal management elements 360 can be included. SoC device 320 and power system 330 can be optionally mounted to one or more circuit boards which are housed within one or more enclosures.

Referring still to FIG. 3, SoC device 320 comprises an integrated circuit device which can include micro-processor elements and processing circuitry that retrieves and executes software from storage system 313 and RAM 315. Software can include various operating systems, user applications, gaming applications, multimedia applications, or other user applications. SoC device 320 may be implemented within a single processing device, but may also be distributed across multiple processing devices or sub-systems that cooperate in executing program instructions. SoC device 320 might be integrated into a single shared semiconductor die, or elements might span more than one die. Examples of SoC device 320 include general purpose central processing units (CPUs), application specific processors, graphics processing units (GPUs), and logic devices, as well as any other type of processing device, combinations, or variations thereof.

In FIG. 3, SoC device 320 includes central processing unit 321 with twelve (1-12) processing cores and graphics processing unit 322 with thirty (1-30) processing cores. Cores of GPU 322 can comprise specialized graphics processing cores, while cores of CPU 321 can comprise general purpose processing cores. Furthermore, SoC device 320 includes other miscellaneous cores and circuitry, namely communication interfaces 323, memory interfaces 324, auxiliary memory 327, and control core 325. Some of the noted elements of SoC device 320 can be included in a north bridge portion of SoC device 320. Elements of control core 325 and auxiliary memory 327 might be included in circuitry external to SoC device 320. SoC device 320 is operatively coupled with other elements in computing system 300 external to SoC device 320, such as south bridge 312, storage system 313, display interfaces 314, RAM 315, and network interfaces 316. Control core 325 is one example of power controller 140 of FIG. 1, although variations are possible.

Data storage elements of computing system 300 include storage system 313, RAM 315, and auxiliary memory 327. These data storage elements may comprise any computer readable storage media readable by SoC device 320 and capable of storing software. These data storage elements may include volatile and nonvolatile, removable and non-removable media implemented in any method or technology for storage of information, such as computer readable instructions, data structures, program modules, or other data. Examples of storage media include dynamic random access memory (DRAM), static random access memory (SRAM), read only memory, magnetic disks, optical disks, flash memory, virtual memory and non-virtual memory, magnetic disk storage or other magnetic storage devices, or any other suitable storage media. Storage system 313 may comprise additional elements, such as a controller, capable of communicating with SoC device 320 or possibly other systems.

South bridge 312 includes interfacing and communication elements which can provide for coupling of SoC device 320 to peripherals, user input devices, user interface devices, printers, audio circuitry, microphones, speakers, touch interfaces, or other external devices and elements. In some examples, south bridge 312 includes a system management bus (SMBUS) controller or other system management controller elements.

Display interfaces 314 comprise various hardware and software elements for outputting digital images, video data, audio data, or other graphical and multimedia data which can be used to render images on a display, touchscreen, or other output devices. Digital conversion equipment, filtering circuitry, image or audio processing elements, or other equipment can be included in display interfaces 314.

Network interfaces 316 can provide communication between computing system 300 and other computing systems (not shown), which may occur over a communication network or networks and in accordance with various communication protocols, combinations of protocols, or variations thereof. Example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

As mentioned above, elements of computing system 300 can also comprise one or more enclosures that can include various structural support elements, cases, chassis elements, or other elements that house and structurally support the further elements of computing system 300. Optional thermal management elements 360 can include heatsinks, fans, heat pipes, heat pumps, refrigeration elements, or other elements to manage and control temperature of an optional enclosure and computing system 300. Typically, thermal management elements 360 are included for SoC device 320 or associated circuitry. Thermal monitoring elements can include one or more temperature sensors comprising thermocouples, silicon bandgap temperature sensors, thermistors, resistance temperature detectors (RTDs), other temperature sensing elements.

Input power conditioning circuitry 339 can include filtering, surge protection, electromagnetic interference (EMI) protection and filtering, as well as perform other input power functions for input power 301. In some examples, input power conditioning circuitry 339 includes AC-DC conversion circuitry, such as transformers, rectifiers, power factor correction circuitry, or switching converters. When a battery source is employed as input power 301, then input power conditioning circuitry 339 can include various diode protection, DC-DC conversion circuitry, or battery charging and monitoring circuitry. Some of the elements of power system 330 might be included in input power conditioning circuitry 339.

As mentioned above, SoC device 320 includes many different internal elements and structures, such as processing unit 321 having processing cores 1-12, graphics unit 322 having graphics cores 1-30, communication interfaces 323, memory interfaces 324, control core 325, and auxiliary memory 327. However, each of these internal elements might be associated with a separate or dedicated power domain, or one or more of these internal elements might be serviced by multiple power domains. A power domain can comprise a set of power links, planes, distribution structures, or interconnect which is independent within SoC device 320 from other power domains. Power distribution structures of each power domain can receive input voltages having different voltage levels, which may be independently varied based on a voltage optimization process described herein. For example, a manufacturer of central processing unit 321 might specify a nominal input voltage level ($V_{DD}$) of 1.00 VDC, but variations in this nominal input voltage level can be determined based on performance testing executed for SoC device 320. In such examples, individual processing cores might be able to be operated at exemplary voltage levels 0.950 VDC, 0.925 VDC, 0.900 VDC, and 0.912 VDC. Other power domains can have other voltage levels determined.

FIG. 3 shows an example implementation of power domains, also referred to herein as voltage domains. Voltage domains 351-358 each comprise separate power distribution structures within SoC device 320 that independently distribute input voltage/power to associated processing cores. Voltage domains 351-358 might comprise voltage-isolated portions of a semiconductor die that forms SoC device 320. For example, when SoC device 320 comprises one or more semiconductor dies, then each voltage domain 351-358 comprises a separate set of fabricated features that route input voltages to associated processing cores and prevents electrical coupling of voltages across voltage domains. A ground or reference voltage might be shared among more than one voltage domain, but some examples can isolate grounds between each voltage domain.

Ones of the plurality of processing cores in SoC device 320 are grouped into sets by power distribution elements that form voltage domains 351-358. For example, in GPU 322, cores 1-6 are grouped into a set comprising voltage domain 351, cores 7-12 are grouped into a set comprising voltage domain 352, cores 13-18 are grouped into a set comprising voltage domain 353, cores 19-24 are grouped into a set comprising voltage domain 354, cores 25-30 are grouped into a set comprising voltage domain 355. In CPU 321, cores 1-6 are grouped into a set comprising voltage domain 356, and cores 7-12 are grouped into a set comprising voltage domain 357. Miscellaneous cores of SoC device 320, such as control core 325, memory 327, and interfaces 323-324 are grouped into a set comprising voltage domain 358.

Thus, sets of processing cores within a single processing unit are segregated into different power/voltage domains which couple to external connections to separately receive input voltages for the sets. In FIG. 3, the external connections comprise interconnect elements 382 comprising voltage input pins or voltage input balls of SoC device 320 and provide electrical isolation among voltage domains 351-358 with regard to corresponding input voltages. Each of voltage domains 351-358 will thus have one or more external connections in a set that serve the particular voltage domain. Advantageously, the isolation among voltage domains in SoC 320 is established for each of the sets of processing cores, power distribution structures, internal interconnect, and external interconnect.

Moreover, even when the input voltages are isolated among voltage domains 351-358, the plurality of processing cores of all power domains of a processing unit might share one or more communication links configured to tolerate relative variations in the input voltages between associated voltage domains 351-358. FIG. 3 shows communication bus 381 shared among all processing cores of SoC device 320. Other implementations might have a first communication bus shared by cores of GPU 322, a second communication bus shared by cores of CPU 321, and a further communication bus for elements 323-328 (not shown in FIG. 3 for clarity). As mentioned above, these communication busses can function properly to interconnect affected processing cores even when the processing cores might be in different voltage domains that have different input voltages (e.g. different $V_{DD}$ voltages for each voltage domain).

Typically, a manufacturer of SoC device 320 will specify a default or preferred operating voltage for each input voltage. This input voltage might refer to a $V_{DD}$ or similar voltage designator, and have a manufacturer specified operating range bounded by a minimum and maximum voltage. Thus, a common manufacturer-specified input voltage level is typically specified for all of the plurality of processing cores of a processing unit. However, as is discussed herein, due in part the particular configuration of voltage domains and power phases, a plurality of power supply phases 331-338 is configured to individually vary voltage levels applied to a plurality of power domains 351-358 responsive to indications received from control core 325 of the processor. The plurality of power supply phases 331-338 are also configured to individually remove power applied to power domains 351-358 responsive to indications received from control core 325.

Power system 330 includes power phases 331-338 which receive supply power over internal power distribution link 372 from input power conditioning circuitry 339. Link 372 can represent more than one voltage link or power link. Power phases 331-338 individually convert and adjust voltage levels to produce input voltages for delivery to corresponding power domains 351-358 of SoC device 320. Power phases 331-338 can provide input voltages at associated current levels to SoC device 320. SoC device 320 receives power over input power links 341-348 as supplied by the plurality of power phases 331-338. In many examples, each of power phases 331-338 can convert or alter a supply voltage of link 372 to a different resultant voltage on associated links 341-348, along with any related voltage regulation. Power phases 331-338 might receive supply power over link 372 at a first voltage level and convert this first voltage level into various second voltage levels. These second voltage levels can be different among each of power phases 331-338, and each can correspond to a different power domain of SoC device 330. Power phases 331-338 comprise various power electronics, power controllers, DC-DC conversion circuitry, power transistor gate modulation circuitry, power transistors, half-bridge elements, filters, passive components, and other elements to convert supply power received over link 372 into input power usable by SoC device 320.

Control core 325 can instruct power phases 331-338 over link 388 to provide particular voltage levels for one or more voltage domains of SoC device 320. Control core 325 can instruct power phases 331-338 to provide particular voltage levels for one or more operational modes, such as normal, standby, idle, and other modes. Control core 325 can receive instructions via external control link 389, which may comprise one or more programming registers, application programming interfaces (APIs), or other components. Control core 325 can provide status over link 389, such as temperature status, power phase status, current/voltage level status, or other information.

Control core 325 comprises a processing core separate from processing cores of central processing unit 321 and graphics cores of graphics processing unit 322. Control core 325 might be included in separate logic or processors external to SoC device 320 in some examples. Control core 325 typically handles initialization procedures for SoC device 320 during a power-on process or boot process. Thus, control core 325 might be initialized and ready for operations prior to other internal elements of SoC device 320. Control core 325 can comprise power control elements, such as one or more processors or processing elements, software, firmware, programmable logic, or discrete logic. Control core 325 can execute a voltage minimization process or voltage optimization process for integrated circuit device 320. In other examples, control core 325 can include circuitry to instruct external power control elements and circuitry to alter voltage levels provided to integrated circuit device 320, or interface with circuitry external to SoC device 320 to cooperatively perform the voltage minimization process or voltage optimization process for integrated circuit device 320.

Control core 325 can comprise one or more microprocessors and other processing circuitry. Control core 325 can retrieve and execute software or firmware, such as firmware 326 comprising power phase control firmware, power monitoring firmware, and voltage optimization or minimization firmware from an associated storage system, which might be stored on portions of storage system 313, RAM 315, or auxiliary memory 327. Control core 325 can be implemented within a single processing device but can also be distributed across multiple processing devices or sub-systems that cooperate in executing program instructions. Examples of control core 325 include general purpose central processing units, application specific processors, and logic devices, as well as any other type of processing device, combinations, or variations thereof. In some examples, control core 325 comprises a processing core separate from other processing cores of SoC device 320, a hardware security module (HSM), hardware security processor (HSP), security processor (SP), trusted zone processor, trusted platform module processor, management engine processor, microcontroller, microprocessor, FPGA, ASIC, application specific processor, or other processing elements. One example implementation of control core 325 is shown as power control system 510 of FIG. 5, although variations are possible.

During power-on operations or boot operations, control core 325 can receive power from power phase 338 and responsively instruct power system 330 to provide power to SoC device 320 according to voltage identifiers (VIDs) and applies any offsets or margins determined from a voltage minimization process or voltage optimization process. These VID-indicated voltages can be stored in data structures 328 in auxiliary memory 327, among other implementations. VIDs can be considered 'default' voltages that are typically specified according to a manufacturer specification or hard-coded by a manufacturer using electronic fuses (e-fuses). In some examples, once these default VIDs are set by a manufacturer, they cannot be altered by an operator or user of SoC device 320. VIDs typically comprise a normalized value or encoded bits which are used to derive an actual voltage for driving SoC device 320.

Once at least control core 325 is powered on after receiving input power from power system 330, then control core 325 can read voltage offsets from data structures 328 in auxiliary memory 327. These voltage offsets might be previously determined by a voltage minimization or optimization process, such as described herein, and stored in auxiliary memory 327 for later usage. Example voltage offsets can indicate incremental offset to default VIDs for voltage domains 351-358, which can include positive or negative offsets. The voltage offsets might be stored in auxiliary memory 327 using a secure storage process, such as a digitally signed security process. A security process executed by control core 325 can authenticate the voltage offsets and ensure that tampering or alteration was not performed. The security process can include public-private key encryption techniques or other digital signature/authentication or data encryption techniques.

The voltage values determined from the voltage minimization or optimization process can be stored into a memory device or data structure along with other corresponding information, such as time/date of the functional tests, version information for the functional tests, or other information. The version identifier can be used to provide special handling of results determined by different revisions of system 300. This data structure can be securely signed by a hardware security module (HSM) to ensure that the stored voltage information and related information is authentic. A digital signature for the data structure can be validated during each subsequent boot of SoC device 320, and used as the selected operational voltage for the remainder of any factory/manufacturing tests and subsequent user site operation.

Control core 325 can generate a voltage settings table in a secure memory using VIDs and voltage offsets. This secure memory might include portions of memory 327, such as to include data structures 328 that includes table 302. In some examples, control core 325 adds voltages that correspond to the VIDs to the voltage offsets and generates new VIDs which are stored in secure memory. These new VIDs can be presented to power phases 331-338 which responsively implement input voltages for SoC device 320 that correspond to the VIDs/offsets. Various margins or adjustments to the new VIDs or other voltage information can be made during operation of SoC device 320, such as to add additional margins, implement end-of-life (EoL) margins, or other features. In typical examples, only control core 325 can access the secure memory, and processing cores or graphics cores of SoC device 320 cannot access the secure memory. Thus, a user-level application run in an operating system cannot typically directly modify VIDs/offsets. However, control core 325 might still receive requests from various software, drivers, hypervisors, or other elements to change VIDs responsive to user commands or other alteration inputs.

In FIG. 3, example voltage parameters are shown in table 302 which can be stored and retrieved in data structures 328 in memory 327, among other locations. These example voltage parameters can comprise voltage offsets to be applied to one or more baseline operating voltages or default VIDs. An example table 302 for voltage parameters includes a first column indicating numerical identifiers for a particular voltage domain of SoC device 520 (V1-V8) that correspond to voltage domains 351-358 which receive power from corresponding ones of power phases 331-338 over links 341-348. A second column is included in table 302 indicating descriptive identifiers for the voltage domains (e.g. GPU A-E, CPU A-B, and MISC. A), while a third column indicates baseline or default operating voltages for the voltage domains, and a fourth column indicates voltage offsets for the voltage domains. The baseline operating voltages might be included in a separate data structure, or indicated by e-fuses or other system elements. Each of the voltage offsets can be applied to the baseline operating voltages to determine a voltage level to be applied to each voltage domain. Control core 325 can then determine control instructions for voltage regulation units of power system 330, such as resultant VIDs or other representations of target voltage levels which are presented to selected power phases 331-338 over link 388.

Figure 4:
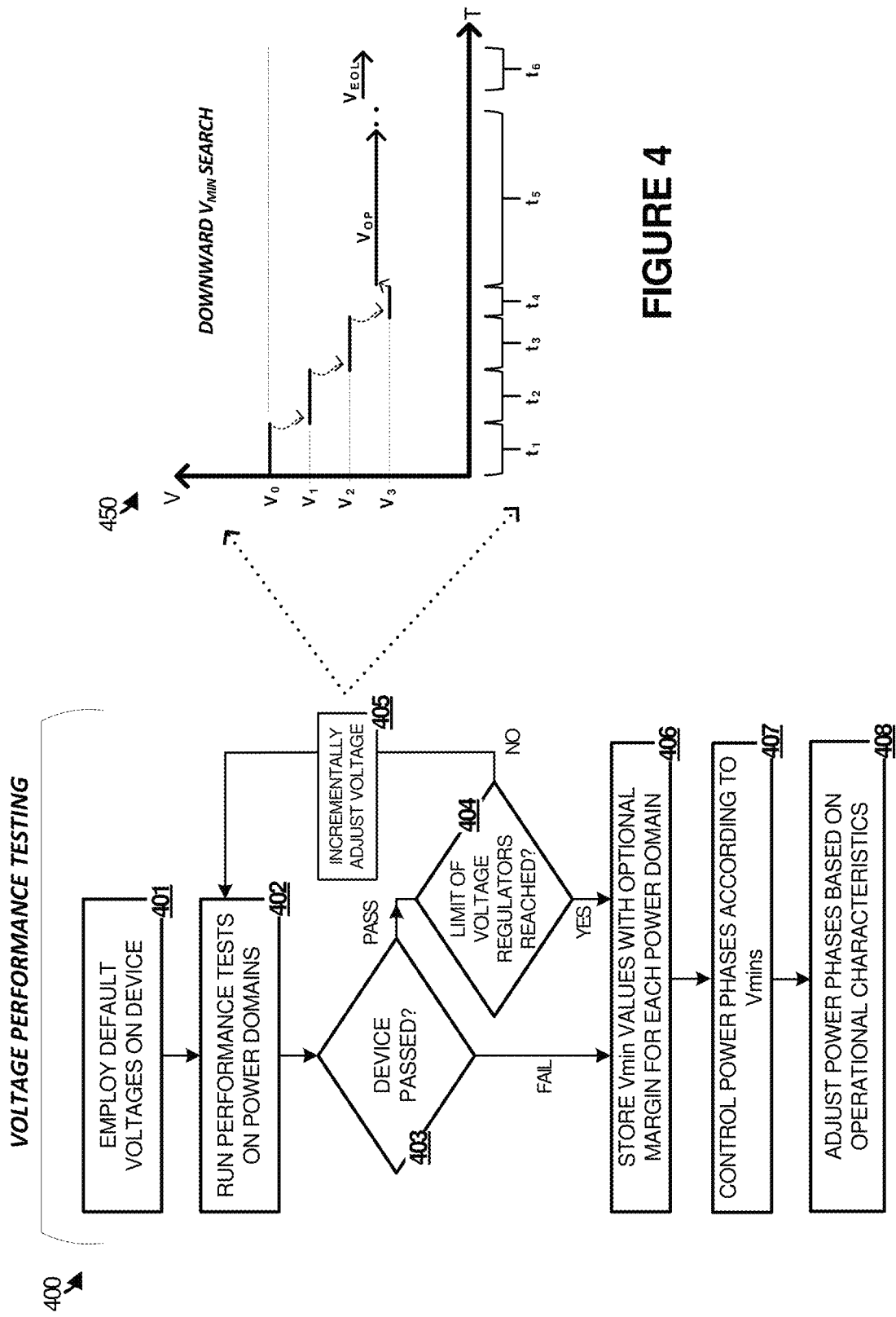
FIG. 4 illustrates a method of operating a computing system in an implementation.

FIG. 4 is included to illustrate operation of performance testing to determine performance properties of target integrated circuit devices in computing systems. Specifically, FIG. 4 is a flow diagram illustrating a method of operating elements of power control circuitry in an implementation. This power control circuitry can comprise power controller 140 in FIG. 1, control core 325 in FIG. 3, or power control system 510 in FIG. 5. In FIG. 4, a performance test is executed for a target integrated circuit device, such as system processor 120 in FIG. 1, or SoC device 320 in FIG. 3. For purposes of example, the operations below are executed in context with computing system 300, SoC device 320, and power system 330. In other examples, the operations of FIG. 4 can be performed by elements of FIG. 5, such as power control system 510.

A performance test can be initiated by control core 325 and executed by processing cores or processing elements of SoC device 320. SoC device 320 is typically booted into an operating system to run the performance testing of FIG. 4. During execution of the performance test on SoC device 320, input voltages will be incrementally adjusted by control core 325 and power system 330 to determine minimum functional operating voltage levels. In one example, this performance test includes incrementally adjusting at least one input voltage by initially operating one or more voltage domains of SoC device 320 at a first input voltage lower than a manufacturer specified operating voltage and progressively lowering the input voltage in predetermined increments while performing the functional test and monitoring for occurrence of the operational failures. In another example, this performance test includes incrementally adjusting at least one input voltage by initially operating one or more voltage domains of SoC device 320 at a first supply voltage lower than a manufacturer specified operating voltage and progressively raising the input voltage in predetermined increments while performing the functional test and monitoring for occurrence of the operational failures.

In manufacturing operations, a computing system comprising SoC device 320 is built and then tested individually according to a performance test. After the performance test has characterized SoC device 320 for minimum operating voltage plus any applicable voltage margin, SoC device 320 can be operated normally using these voltages. This performance test determines minimum supply voltages for proper operation of SoC device 320, which also relates to a power consumption of SoC device 320. Voltage is related to power consumption by Ohm's law and Joule's first law, among other relationships, and thus a lower operating voltage typically corresponds to a lower operating power for SoC device 320. Power consumption relates to an operating temperature, giving similar workloads for SoC device 320. Thus, the voltage adjustment method discussed in FIG. 4 allows power control circuitry to determine appropriate reduced input voltages for SoC device 320, resulting in power savings for computing system 300.

A processing device, such as SoC device 320 of FIG. 3, is incorporated into a computing system, such as computing system 300. SoC device 320 also includes many contextual assembly elements, such as seen for south bridge 312, storage elements 313, display interfaces 314, random-access memory 315, and network interfaces 316. In many examples, SoC device 320 is installed into computing system 300 during a system assembly process before testing and further assembly. Thus, the hardware and software elements included in computing system 300 are typically the actual contextual elements for operating SoC device 320 once installed into a computing system.

Control core 325 initially employs (401) default input voltages to provide power to SoC device 320. For example, control core 325 can instruct power system 330 to provide input voltages over associated power links according to manufacturer-specified operating voltages, which can be indicated by VID information 328 stored in auxiliary memory 327 or elsewhere and retrieved by control core 325. In other examples, such as when progressively rising input voltages are iteratively provided to SoC device 320, the default voltages can comprise a starting point from which to begin raising input voltage levels over time. In examples that employ incrementally rising input voltages, starting input voltages might be selected to be sufficiently low enough and less than those supplied by a manufacturer. Other default voltage levels can be employed. Once the input voltages are provided, SoC device 320 can initialize and boot into an operating system or other functional state.

An external system might transfer one or more functional tests for execution by SoC device 320 after booting into an operating system. A manufacturing system can transfer software, firmware, or instructions to control core 325 over link 389 to initiate one or more functional tests of SoC device 320 during a voltage adjustment process. These functional tests can be received over communication interface 323 of SoC device 320 and can comprise performance tests that exercise the various integrated elements of SoC device 320 (e.g. central processing unit 321 and graphics processing unit 322) as well as the various contextual assembly elements of SoC device 320. Portions of the voltage adjustment process or functional tests can be present before boot up to adjust input voltages for SoC device 320, such as by first initializing a first portion of SoC device 320 before initializing second portions.

Once SoC device 320 can begin executing the functional test, control core 325 drives (402) one or more performance tests on each of the power domains 351-358 of SoC device 320. Power domains 351-358 can each include different input voltage levels and input voltage connections to power phases 331-338. The functional tests can exercise two or more of the power domains simultaneously, which might further include different associated clock signals to run associated logic at predetermined frequencies. The functional tests can include operations initiated simultaneously on more than one processing core to produce both static/DC power demand and dynamic/AC power demand for the processing cores, graphics cores, and interfacing cores that replicates real-world operations. Moreover, the functional tests include processes that exercise elements of SoC device 320 in concert with elements 312-316, which might include associated storage devices, memory, communication interfaces, thermal management elements, or other elements.

The performance tests will typically linger at a specific input voltage or set of input voltages for a predetermined period of time, as instructed by any associated control firmware or software. This predetermined period of time allows for sufficient execution time for the functional tests to not only exercise all desired system and processor elements but also to allow any errors or failures to occur. The linger time can vary and be determined from the functional tests themselves, or set to a predetermined time based on manufacturing/testing preferences. Moreover, the linger time can be established based on past functional testing and be set to a value which past testing indicates will capture a certain population of errors/failures of system processors in a reasonable time.

If SoC device 320 does not experience failures or errors relevant to the voltage adjustment process during the linger time, then the specific input voltages employed can be considered to be sufficiently high to operate SoC device 320 successfully (403). Thus, the particular iteration of input voltage levels applied to SoC device 320 is considered a 'pass' and another progressively adjusted input voltage can be applied. As seen in operation (405) of FIG. 4, input voltages for SoC device 320 can be incrementally adjusted (such as lowered), SoC device 320 restarted, and the functional tests executed again for the linger time. A restart of SoC device 320 might be omitted in some examples, and further operational testing can be applied at a new input voltage level for each linger timeframe in a continuous or repeating manner. This process is repeated until either lower limits of voltage adjustment circuitry, such as power phases 331-338 associated with power system 330, have been reached (404), or relevant failures of SoC device 320 or contextual components of computing system 300 are experienced. This process is employed to determine reduced operating voltages for SoC device 320 in the context of the assembly elements of computing system 300. Once voltage adjustments for the associated power domains are found, indications of these voltage adjustments can be stored for later use at voltage 'minimums' (Vmins) in operation 406, optionally with margins appropriate for operational 'safety' to reduce undiscovered failures or errors during the functional testing.

The functional tests can comprise one or more applications, scripts, or other operational test processes that bring processing cores of specific voltage domains up to desired power consumption and operation, which may be coupled with ensuring that SoC device 320 is operating at preferred temperature as well. These functional tests may also run integrity checks (such as checking mathematical computations or checksums which are deterministic and repeatable). Input voltages provided by power system 330 to SoC device 320, as specified by an associated performance test control system and communicated to control core 325, can be lowered one incremental step at a time and the functional tests run for a period of time until a failure occurs. The functional tests can automatically handle all possible failure modes resulting from lowering the voltage beyond functional levels. The possible failures include checksum errors detected at the test application level, a kernel mode crash detected by the operating system, a system hang, or hardware errors detected by system processor resulting in "sync flood" error mechanisms, among others. All failure modes can be automatically recovered from for further functional testing. To enable automatic recovery, a watchdog timer can be included and started in a companion controller, such as a "System Management Controller" (SMC), Embedded Controller, control core 325, or other control circuitry. The functional tests can issue commands to the companion controller to initialize or reset the watchdog timer periodically. If the watchdog timer expires or SoC device 320 experiences a failure mode, the companion controller can perform a system reset for computing system 300 or SoC device 320. Failure modes that result in a system reset can prompt control core 325 to initialize SoC device 320 with 'default' or 'known good' input voltage levels from power system 330. These default input voltage levels can include manufacturer specified voltages or include voltage levels associated with a most recent functional test 'pass' condition.

Once SoC device 320 initializes or boots after a failure during the functional tests, the failure can be noted by a failure process in the functional tests or by another entity monitoring the functional tests, such as a performance test control system or manufacturing system. The input voltage level can then be increased a predetermined amount, which might comprise one or more increments employed during the previous voltage lowering process. The increase can correspond to 2-3 increments in some examples, which might account for test variability and time-to-fail variability in the functional tests.

The voltage values determined from the voltage adjustment process can be stored (406) by control core 325 into a memory device or data structure along with other corresponding information, such as time/date of the functional tests, version information for the functional tests, or other information. Moreover, the voltage values are determined on a per-voltage domain basis, and thus are voltage values representing voltage minimums for each voltage domain are stored. Table 302 in FIG. 3 shows example voltage values for voltage domains V1-V8. Control core 325 might store these voltage values in auxiliary memory 327 or in one or more data structures 328 which indicate absolute values of voltage values or offset values of voltage values from baseline voltage values. Control core 325 might communicate the above information to an external system over link 389, such as a manufacturing system or performance test control system. Other stored information can include power consumption peak values, average values, or ranges, along with 'bins' into which each computing module is categorized.

Stored voltage information can be used during power-on operations of computing system 300 to control (407) power phases 331-338 and establish input voltage levels to be indicated by control core 325 to power phases 331-338 of power system 330. The resulting computing module characteristics (e.g. power levels and thermal attributes) are substantially improved after the voltage adjustment process is completed. Thus, the voltage adjustment process described above allows systems to individually determine appropriate reduced operating voltages for individual voltage phases 351-358 during a manufacturing or integration testing process, and for testing performed in situ after manufacturing occurs. Testing can be performed to determine changes in minimum operating voltages after changes are detected to SoC device 320, contextual elements 312-316, or periodically after a predetermined timeframe.

The iterative voltage search procedure can be repeated independently for each power domain and for each power state in each domain where power savings are to be realized. For example, a first set of functional tests can be run while iteratively lowering an input voltage corresponding to a first voltage/power domain of SoC device 320. A second set of functional tests can then be run while iteratively lowering a second input voltage corresponding to a second voltage/power domain of SoC device 320. When the second set of functional tests are performed for the second input voltage, the first voltage can be set to a value found during the first functional tests or to a default value, among others.

Advantageously, end-of-life (EoL) voltage margin need not be added during manufacturing test or upon initial shipment of computing system 300. EoL margin can be added if desired, such as 10 to 50 millivolts (mV), among other values, or can be added after later in-situ testing described below. EoL margins are typically added in integrated circuit systems to provide sufficient guardband as associated silicon timing paths in the integrated circuit slow down over time with use. Although the amount of margin typically employed for EoL is only perhaps 15-30 mV (depending upon operating conditions, technology attributes, and desired life time), the systems described herein can eliminate this margin initially, either partially or entirely. In some examples, an initial voltage margin is employed incrementally above the Vmin at an initial time, and later, as the system operates during normal usage, further EoL margin can be incrementally added proportional to the total operational time (such as in hours) of a system or according to operational time for individual voltage domains. Thus, extra voltage margin is recovered from SoC device 320 after the initial voltage adjustment process, and any necessary margin for EoL can be staged back over the operational lifetime of SoC device 320. Moreover, by operating a user system at lower voltages for a longer period of time, system reliability is further improved. These benefits might taper off over the course of time as the EoL margin is staged back in, but it will improve the initial experience.

FIG. 4 also illustrates graph 450 that show how a voltage adjustment process might progress. Graph 450 can illustrate one example voltage minimization operation for operation 405 of FIG. 4. Graph 450 shows a 'downward' incremental Vmin search using progressively lowered voltages, with safety margin added at the end of the process to establish an operational voltage, $V_{OP}$. Later margin ($V_{EOL}$) can be staged in to account for EoL concerns. Specifically, graph 450 shows a default or initial voltage level $V_0$ applied to SoC device 320. After a linger time for a functional test, a successful outcome prompts an incremental lowering to $V_1$ and retesting under the functional test. Further incremental lowering can be performed for each successful iteration of the functional test for an associated time indicated in graph 450. Finally, a lowest or reduced operating voltage is found at $V_3$ and optional margin is applied to establish $V_{OP}$. $V_{OP}$ is employed for the normal operation of the system processor for a period of operational time indicated by $t_5$. This time can occur while an associated system is deployed on-site. After a designated number of hours indicated by $t_5$, EoL margin can be staged in to established $V_{EOL}$. Multiple stages of EoL margin can occur, although only one is shown in graph 450 for clarity.

The voltage levels indicated in graph 450 can vary and depend upon the actual voltage levels applied to a system processor. For example, for a voltage domain of SoC device 320 operating around 0.9V, a reduced voltage level can be discovered using the processes in graph 450. Safety margin of 50 mV might be added in graph 450 to establish $V_{OP}$ and account for variation in user applications and device aging that will occur over time. However, depending upon the operating voltage, incremental step size, and aging considerations, other values could be chosen. In contrast to the downward voltage search in graph 450, an upward voltage search process can instead be performed. An upward voltage search process uses progressively raised voltages to establish an operational voltage, $V_{OP}$. Later margin ($V_{EOL}$) can be staged in to account for EoL concerns.

The processes in graph 450 can be executed independently for each power supply phase or power domain associated with SoC device 320. Running the procedure on one power supply phase or power domain at a time can allow for discrimination of which power supply phase or power domain is responsible for a system failure when looking for the Vmin of each domain. However, lowering multiple voltages for power supply phases or power domains at the same time can be useful for reducing test times, especially when failures can be distinguished in other ways among the various power supply phases or power domains. In further examples, a 'binary' voltage adjustment/search algorithm can be used to find the Vmin by reducing the voltage halfway to an anticipated Vmin as opposed to stepping in the increments of graph 450. In such examples, a Vmin further testing might be needed by raising the voltage once a failure occurred and successfully running system tests at that raised value. Other voltage adjustment/search techniques could be used and the techniques would not deviate from the operations to establish a true Vmin in manufacturing processes that can then be appropriately adjusted to provide a reasonable margin for end user operation.

During operation of SoC device 320, such as during execution of user software after booting into an operating system, control core 325 can individually adjust (408) voltage provided to SoC device 320 by power phases 331-338 based on operational characteristics of SoC device 320. Control core 325 can monitor operational characteristics of SoC device 320 associated with voltage domains 351-358. These operational characteristics can include a quantity of cores presently employed for execution of software by processing units of SoC device 320, a workload of processing units of SoC device 320, a present electrical current draw or power consumption within each voltage domain, or other characteristics. Control core 325 then adjusts voltages output by power phases 331-338 based on operational characteristics of SoC device 320. This adjustment can include increasing or decreasing a voltage level provided to individual ones of the voltage domains. This adjustment can also include enabling or disabling a power phase for one or more voltage domain responsive to activity or cessation of activity for processing cores comprising the voltage domain. Advantageously, voltage levels provided to sets of processing cores of SoC device 320 can be individually adjusted to reduce power consumption for the sets of the processing cores or eliminate power consumption entirely when a particular set of processor cores is idle or dormant. Since each set of processing cores is included in a separate power domain, then voltage levels can differ among the sets. Moreover, since the sets each comprise subsets of the total quantity of processing cores for a processing unit, then a processing unit might have some cores operating at different voltages than other cores. These voltages are provided though dedicated external connections 382 of SoC device 320 from external power phases 331-338.

Figure 5:
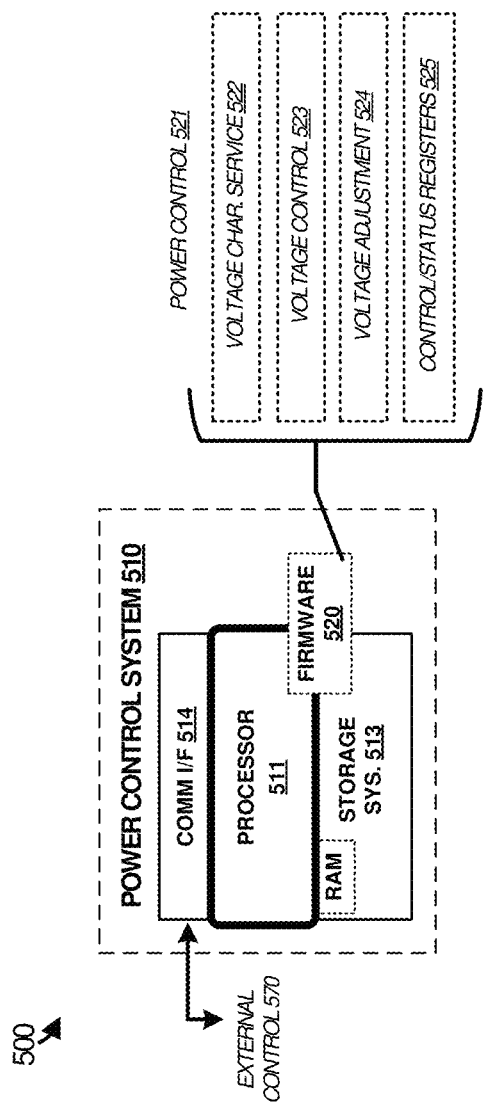
FIG. 5 illustrates an example control system suitable for implementing any of the architectures, platforms, processes, methods, and operational scenarios disclosed herein.

FIG. 5 illustrates power control system 510 that is representative of any system or collection of systems from which the various power phase control and performance testing operations can be directed. Any of the power phase control and control of performance testing employed in the operational architectures, platforms, scenarios, and processes disclosed herein may be implemented using elements of power control system 510. In one implementation, power control system 510 is representative of at least a portion of power controller 140 or control core 325 of FIG. 3. For performance testing, power control system 510 might also include elements of an external system, such as a manufacturing system communicatively coupled to power controller 140 or control core 325 of FIG. 3.

Power control system 510 may be implemented as a single apparatus, system, or device or may be implemented in a distributed manner as multiple apparatuses, systems, or devices. Power control system 510 includes, but is not limited to, processor 511, storage system 513, communication interface system 514, and firmware 520. Processor 511 is operatively coupled with storage system 513 and communication interface system 514.

Processor 511 loads and executes firmware 520 from storage system 513. Firmware 520 includes power control 521, which is representative of the processes discussed with respect to the preceding Figures and operations. When executed by processor 511 to enhance power phase control and voltage optimization/minimization for target integrated circuit devices, firmware 520 directs processor 511 to operate as described herein for at least the various processes, operational scenarios, and sequences discussed in the foregoing implementations. Power control system 510 may optionally include additional devices, features, or functionality not discussed for purposes of brevity.

Referring still to FIG. 5, processor 511 may comprise a microprocessor and processing circuitry that retrieves and executes firmware 520 from storage system 513. Processor 511 may be implemented within a single processing device, but may also be distributed across multiple processing devices, sub-systems, or specialized circuitry, that cooperate in executing program instructions and in performing the operations discussed herein. Examples of processor 511 include general purpose central processing units, application specific processors, and logic devices, as well as any other type of processing device, combinations, or variations thereof.

Storage system 513 may comprise any computer readable storage media readable by processor 511 and capable of storing firmware 520. Storage system 513 may include volatile and nonvolatile, removable and non-removable media implemented in any method or technology for storage of information, such as computer readable instructions, data structures, program modules, or other data. Examples of storage media include random access memory (RAM), read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 513 may also include computer readable communication media over which at least some of firmware 520 may be communicated internally or externally. Storage system 513 may be implemented as a single storage device, but may also be implemented across multiple storage devices or sub-systems co-located or distributed relative to each other. Storage system 513 may comprise additional elements, such as a controller, capable of communicating with processor 511 or possibly other systems.

Firmware 520 may be implemented in program instructions and among other functions may, when executed by processor 511, direct processor 511 to operate as described with respect to the various operational scenarios, sequences, and processes illustrated herein. For example, firmware 520 may include program instructions for enhanced power control and voltage optimization/minimization for target integrated circuit devices, among other operations.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Firmware 520 may include additional processes, programs, or components, such as operating system software or other application software, in addition to that of power control 521. Firmware 520 may also comprise program code, scripts, macros, and other similar components. Firmware 520 may also comprise software or some other form of machine-readable processing instructions executable by processor 511.

In general, firmware 520 may, when loaded into processor 511 and executed, transform a suitable apparatus, system, or device (of which power control system 510 is representative) overall from a general-purpose computing system into a special-purpose computing system customized to facilitate enhanced power phase control and voltage optimization/minimization for target integrated circuit devices. Encoding firmware 520 on storage system 513 may transform the physical structure of storage system 513. The specific transformation of the physical structure may depend on various factors in different implementations of this description. Examples of such factors may include, but are not limited to, the technology used to implement the storage media of storage system 513 and whether the computer-storage media are characterized as primary or secondary storage, as well as other factors.

For example, if the computer readable storage media are implemented as semiconductor-based memory, firmware 520 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Power control 521 can include one or more software elements, such as an operating system, devices drivers, and one or more applications. These elements can describe various portions of power control system 510 with which voltage control elements, voltage optimization elements, or other elements interact. For example, an operating system can provide a software platform on which power control 521 is executed and allows for enhanced voltage control and voltage optimization/minimization for target integrated circuit devices, among other operations.

In one example, voltage characterization service 522 is configured to direct execution of a performance test on a target integrated circuit device to determine at least system performance over one or more incrementally adjusted input voltages for a target integrated circuit device with contextual elements. The performance test can be executed on each of a plurality of voltage domains of a target integrated circuit device determine minimum operating voltages lower than a manufacturer specified operating voltage for at least one input voltage. As seen in the examples herein, each power domain is also associated with a single power phase of a power supply, and thus voltage characterization service 522 can be directed to test the power domain associated with one power supply phase at a time. Transfer of the performance test to a target integrated circuit device can occur over link 570 or other links. The performance test can comprise computer-readable instructions stored within storage system 513. The performance test might comprise a system image or bootable image which includes an operating system, applications, performance tests, voltage regulator control instructions, and other elements which are transferred over link 570 to a target integrated circuit device under test.

In some examples, the performance test for a target integrated circuit device comprises iteratively booting the target integrated circuit device into an operating system after reducing a voltage level of at least one supply voltage applied to at least one voltage domain of the target integrated circuit device. For each reduction in the at least one supply voltage, the performance test includes executing a voltage characterization service to perform one or more functional tests that run one or more application level processes in the operating system and exercise processor core elements and interface elements of the target integrated circuit device in context with a plurality of elements external to the target integrated circuit device which share the at least one supply voltage. The performance test also includes monitoring for operational failures of at least the target integrated circuit device during execution of the voltage characterization service, and based at least on the operational failures, determining at least one resultant supply voltage. Iterative booting of the target integrated circuit device can comprise establishing a minimum operating voltage for the at least one supply voltage based on a current value of the iteratively reduced voltages, adding a voltage margin to the minimum operating voltage to establish the at least one resultant supply voltage, and via voltage control 523, instructing voltage regulator circuitry of a power control system (such as voltage regulator units 331-338 of FIG. 3) to supply the at least one resultant supply voltage to the target integrated circuit device for operation of the target integrated circuit device.

Voltage control 523 includes elements which control voltage regulation or voltage adjustment circuitry of a power phases in a power system or power circuitry. Voltage control 523 can indicate target or desired voltage levels to be provided to one or more voltage domains of a target integrated circuit device, such as by instructing power control circuitry to alter voltage levels of one or more voltage control units, voltage phases, or voltage regulator circuits. Voltage control 523 can receive input from voltage control circuitry which indicates present voltage levels, power consumption levels, temperature levels, or other metrics that indicate present operation of voltage control circuitry, voltage regulation circuitry, and target integrated circuit devices, among other elements. Voltage control 523 can also control switching elements, switching logic, or transistor-level transfer elements which control flow of power to a target integrated circuit device or other elements in context with a target integrated circuit device.

Voltage adjustment 524 can adjust power phase voltage levels during operation of a target integrated circuit device, such as during execution of user software after booting into an operating system. Voltage adjustment 524 can adjust power phase voltage levels based on operational characteristics of the target integrated circuit device. Voltage adjustment 524 can monitor operational characteristics of the target integrated circuit device and associated voltage domains. These operational characteristics can include a quantity of cores presently employed for execution of software by processing units of a target integrated circuit device, a workload of processing units of a target integrated circuit device, a present electrical current draw or power consumption within each voltage domain, or other characteristics. Voltage adjustment 524 then adjusts voltages output by power phases. This adjustment can include increasing or decreasing a voltage level provided to individual voltage domains. This adjustment can also include enabling or disabling a power phase for one or more voltage domain responsive to activity or cessation of activity for processing cores comprising the voltage domain.

Control/status registers 525 include one or more non-volatile memory elements which provide status of the operation of power control system 510 to external elements and system over link 570. Control over the operations of control/status registers 525 can also occur via modification or alteration of values stored within control/status registers 525, or of logic-coupled ones of control/status registers 525 which tie to operation of power control system 510. Reads/writes of ones of control/status registers 525 can occur over link 570 from one or more external systems, which may include a target integrated circuit device among other control systems and manufacturing systems. Various example control registers might include performance testing alteration and initiation control registers, performance testing status registers, manual setting of operating voltage levels or minimum/maximum voltage levels, as well as various identification information comprising serial numbers, model numbers, version numbers, and related information for both hardware and software elements.

Communication interface system 514 may include communication connections and devices that allow for communication over link 570 to communicate with elements of a target integrated circuit device, as well as with control electronics, power control systems, voltage adjustment circuitry, voltage adjustment units, power regulator circuitry, power control circuitry, power supply circuitry, or with external systems (not shown in FIG. 5) over one or more communication networks (not shown). Examples of connections and devices that together allow for inter-system communication may include discrete control links, system management buses, serial control interfaces, register programming interfaces, network interface cards, antennas, power amplifiers, RF circuitry, transceivers, and other communication circuitry. The connections and devices may communicate over communication media to exchange packetized communications with other computing systems or networks of systems, such as metal, glass, air, or any other suitable communication media. Communication interface system 514 may include user interface elements, such as programming registers, control/status registers 525, APIs, or other user-facing control and status elements.

Communication between power control system 510 and other circuitry and systems (not shown in FIG. 5), may occur over link 570 comprising a communicate link or a communication network or networks, and in accordance with various communication protocols, combinations of protocols, or variations thereof. These other systems can include target integrated circuit devices, power control systems, or manufacturing systems, among others. Communication interfaces might comprise system management bus (SMBUS) interfaces, inter-integrated circuit (I2C) interfaces, or other similar interfaces. Further examples include intranets, internets, the Internet, local area networks, wide area networks, wireless networks, wired networks, virtual networks, software defined networks, data center buses, computing backplanes, or any other type of network, combination of network, or variation thereof. Some example communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1: A system comprising a plurality of power supply phases and a processor. The processor includes a processing unit comprising a plurality of processing cores, a plurality of power domains configured to segregate power distribution for the processing unit into sets of the plurality of processing cores, and external connections configured to couple individual ones the plurality of power domains to individual ones of the plurality of power supply phases.

Example 2: The system of Example 1, where the processing unit comprises a central processing unit (CPU) or graphics processing unit (GPU), and where each of the plurality of processing cores comprise execution units of the processing unit.

Example 3: The system of Examples 1-2, where ones of the plurality of processing cores are grouped into the sets by power distribution elements which couple to the external connections to separately receive input voltages for the plurality of power domains.

Example 4: The system of Examples 1-3, where the plurality of processing cores share one or more communication links configured to tolerate relative variations in the input voltages between the plurality of power domains.

Example 5: The system of Examples 1-4, comprising the plurality of power supply phases configured to individually vary voltage levels applied to the plurality of power domains responsive to indications received from a control core of the processor.

Example 6: The system of Examples 1-5, comprising the plurality of power supply phases configured to individually remove power applied to the plurality of power domains responsive to indications received from a control core of the processor.

Example 7: The system of Examples 1-6, where the voltage levels applied to the plurality of power domains are customized to the processor by at least executing a performance test on the processor for each of the plurality of power domains to determine the voltage levels as lower than manufacturer specified voltage levels for the processor.

Example 8: The system of Examples 1-7, where the performance test comprises iteratively booting the processor into an operating system after reducing a present level of at least one supply voltage applied to the processor. For each reduction in the present level of the at least one supply voltage, the performance test comprises executing a voltage characterization service to perform one or more functional tests that run one or more application level processes in the operating system and exercise processor core elements and interface elements of the processor which share the at least one supply voltage, monitoring for operational failures of at least the processor during execution of the voltage characterization service, and determining one or more of the voltage levels applied to the plurality of power domains based at least on the operational failures.

Example 9: An integrated circuit device, comprising a plurality of processing cores within a processing unit, a plurality of voltage domains configured to form electrically isolated subsets among the processing cores within the processing unit and distribute input voltages within the subsets to associated ones of the plurality of processing cores, and interconnect elements segregated among the subsets and configured to individually couple the plurality of voltage domains to corresponding external power supply phases.

Example 10: The integrated circuit device of Example 9, where the processing unit comprises a central processing unit (CPU) or graphics processing unit (GPU), and where each of the plurality of processing cores comprise execution units of the processing unit.

Example 11: The integrated circuit device of Examples 9-10, where the interconnect elements comprise voltage input pins or voltage input balls of the integrated circuit device and provide electrical isolation among the plurality of voltage domains with regard to corresponding input voltages.

Example 12: The integrated circuit device of Examples 9-11, where the plurality of voltage domains comprise voltage-isolated portions of a semiconductor die that forms the integrated circuit device.

Example 13: The integrated circuit device of Examples 9-12, where the plurality of processing cores share one or more communication links configured to tolerate relative variations in the input voltages between the plurality of voltage domains.

Example 14: The integrated circuit device of Examples 9-13, comprising the plurality of processing cores configured to accept voltage levels that differ among the plurality of voltage domains, where a common manufacturer-specified input voltage level is specified for all of the plurality of processing cores of the processing unit.

Example 15: The integrated circuit device of Examples 9-14, comprising a control core internal to the integrated circuit device configured to instruct a plurality of power supply phases external to the integrated circuit device to provide the input voltages, where the input voltages differ among at least a portion of the plurality of voltage domains.

Example 16: The integrated circuit device of Examples 9-15, where the input voltages instructed by the control core to be provided by the plurality of power supply phases are customized by at least executing a performance test on the processing unit for each of the plurality of power domains to determine voltage levels for the input voltages as lower than manufacturer specified voltage levels for the processing unit.

Example 17: The integrated circuit device of Examples 9-16, where the performance test comprises iteratively booting the processing unit into an operating system after reducing a present level of at least one input voltage applied to the processing unit. For each reduction in the present level of the at least one input voltage, the performance test comprises executing a voltage characterization service to perform one or more functional tests that run one or more application level processes in the operating system and exercise the plurality of processing cores and interface elements of the processing unit which share the at least one input voltage, monitoring for operational failures of at least the processing unit during execution of the voltage characterization service, and determining one or more of the voltage levels to be applied to the plurality of power domains based at least on the operational failures.

Example 18: A computing system, comprising a plurality of power supply phases configured to produce voltages, a power controller configured to instruct the plurality of power phases to adjust levels of the voltages, and a system processor. The system processor includes at least one processing unit having a plurality of cores, a plurality of voltage domains each configured to provide voltage isolation among sets of the plurality of cores, and voltage input elements configured to receive the voltages from the power supply phases and conductively couple ones of the voltages to corresponding voltage domains.

Example 19: The computing system of Example 18, where the plurality of voltage domains comprise voltage-isolated portions of a semiconductor die that forms the system processor.

Example 20: The computing system of Examples 18-19, where the levels of the voltages are customized among the plurality of voltage domains by at least executing a performance test on the system processor for ones of the cores that comprise each of the plurality of power domains to determine the levels of the voltages as lower than manufacturer specified levels for the system processor.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A system comprising:
a plurality of power supply phases comprising voltage regulation circuitry external to a processor; and
the processor comprising:
a processing unit comprising a plurality of processing cores;
a plurality of power domains configured to segregate power distribution for the processing unit into sets of the plurality of processing cores, wherein the plurality of power domains comprise voltage-isolated portions of a shared semiconductor die that forms the processor; and
external connections configured to separately couple power supplied by individual ones of the plurality of power supply phases to individual ones of the plurality of power domains.

2. The system of claim 1, wherein the processing unit comprises a central processing unit (CPU) or graphics processing unit (GPU), and wherein each of the plurality of processing cores comprise execution units of the processing unit.

3. The system of claim 1, wherein ones of the plurality of processing cores are grouped into the sets by power distribution elements which couple to the external connections to separately receive input voltages for the plurality of power domains.

4. The system of claim 3, wherein the plurality of processing cores share one or more communication links configured to tolerate relative variations in the input voltages between the plurality of power domains.

5. The system of claim 1, comprising:
the plurality of power supply phases configured to individually vary voltage levels applied to the plurality of power domains responsive to indications received from a control core of the processor.

6. The system of claim 1, comprising:
the plurality of power supply phases configured to individually remove power applied to the plurality of power domains responsive to indications received from a control core of the processor.

7. The system of claim 1, wherein the voltage levels applied to the plurality of power domains are customized to the processor by at least executing a performance test on the processor for each of the plurality of power domains to determine the voltage levels as lower than manufacturer specified voltage levels for the processor.

8. The system of claim 7, wherein the performance test comprises:
iteratively booting the processor into an operating system after reducing a present level of at least one supply voltage applied to the processor;
for each reduction in the present level of the at least one supply voltage, executing a voltage characterization service to perform one or more functional tests that run one or more application level processes in the operating system and exercise processor core elements and interface elements of the processor which share the at least one supply voltage;
monitoring for operational failures of at least the processor during execution of the voltage characterization service; and
determining one or more of the voltage levels applied to the plurality of power domains based at least on the operational failures.

9. An integrated circuit device, comprising:
a plurality of processing cores within a processing unit;
a plurality of voltage domains configured to form voltage isolated subsets among the processing cores within the processing unit and distribute input voltages within the subsets to associated ones of the plurality of processing cores, wherein the plurality of voltage domains comprise voltage-isolated portions of a shared semiconductor die that forms the integrated circuit device; and
interconnect elements segregated among the subsets and configured to separately couple power supplied by a plurality of power supply phases external to the integrated circuit device to individual power domains.

10. The integrated circuit device of claim 9, wherein the processing unit comprises a central processing unit (CPU) or graphics processing unit (GPU), and wherein each of the plurality of processing cores comprise execution units of the processing unit.

11. The integrated circuit device of claim 9, wherein the interconnect elements comprise voltage input pins or voltage input balls of the integrated circuit device and provide electrical isolation among the plurality of voltage domains with regard to corresponding input voltages.

12. The integrated circuit device of claim 9, wherein the plurality of processing cores share one or more communication links configured to tolerate relative variations in the input voltages between the plurality of voltage domains.

13. The integrated circuit device of claim 9, comprising:
the plurality of processing cores configured to accept voltage levels that differ among the plurality of voltage domains, wherein a common manufacturer-specified input voltage level is specified for all of the plurality of processing cores of the processing unit.

14. The integrated circuit device of claim 9, comprising:
a control core internal to the integrated circuit device configured to instruct a plurality of power supply phases external to the integrated circuit device to provide the input voltages, wherein the input voltages differ among at least a portion of the plurality of voltage domains.

15. The integrated circuit device of claim 14, wherein the input voltages instructed by the control core to be provided by the plurality of power supply phases are customized by at least executing a performance test on the processing unit for each of the plurality of power domains to determine voltage levels for the input voltages as lower than manufacturer specified voltage levels for the processing unit.

16. The integrated circuit device of claim 15, wherein the performance test comprises:
iteratively booting the processing unit into an operating system after reducing a present level of at least one input voltage applied to the processing unit;
for each reduction in the present level of the at least one input voltage, executing a voltage characterization service to perform one or more functional tests that run one or more application level processes in the operating system and exercise the plurality of processing cores and interface elements of the processing unit which share the at least one input voltage;
monitoring for operational failures of at least the processing unit during execution of the voltage characterization service; and
determining one or more of the voltage levels to be applied to the plurality of power domains based at least on the operational failures.

17. A computing system, comprising:
a plurality of power supply phases comprising voltage regulation circuitry external to a system processor;
a power controller configured to instruct the plurality of power phases to adjust levels of corresponding output voltages; and
the system processor, comprising:
at least one processing unit having a plurality of cores;
a plurality of voltage domains each configured to provide voltage isolation among sets of the plurality of cores, wherein the plurality of voltage domains comprise voltage-isolated portions of a shared semiconductor die that forms the processing unit; and
voltage input elements configured to receive the output voltages supplied externally from the power supply phases and separately couple the output voltages of individual power supply phases to corresponding voltage domains.

18. The computing system of claim 17, wherein the levels of the voltages are customized among the plurality of voltage domains by at least executing a performance test on the system processor for ones of the cores that comprise each of the plurality of power domains to determine the levels of the voltages as lower than manufacturer specified levels for the system processor.

* * * * *